United States Patent
Luo et al.

(10) Patent No.: US 6,536,098 B1
(45) Date of Patent: Mar. 25, 2003

(54) METHOD OF MANUFACTURING PRECISELY COMPRESSED STACKS

(76) Inventors: Erming Luo, 108H W. Constitution St., Norman, OK (US) 73072; John D. Stricklin, 11109 Lakeridge Run, Oklahoma City, OK (US) 73170; Roy L. Wood, 417 Castle Rock Rd., Yukon, OK (US) 73099

( * ) Notice: Subject to any disclaimer, the term of this patent is extended or adjusted under 35 U.S.C. 154(b) by 0 days.

(21) Appl. No.: 09/395,686

(22) Filed: Sep. 13, 1999

Related U.S. Application Data (60) Provisional application No. 60/100,193, filed on Sep. 14, 1998.

(51) Int. Cl.[7] .............................................. G11B 5/127
(52) U.S. Cl. ................................ 29/603.03; 29/407.08; 29/718; 73/761; 360/98.08; 360/99.12
(58) Field of Search ............................. 29/603.03, 447, 29/229, 407.08, 895.22, 718; 360/98.08, 99.12; 73/761, 776

(56) References Cited

U.S. PATENT DOCUMENTS

| | | | |
|---|---|---|---|
| 3,541,844 A | | 11/1970 | Stover |
| 4,106,370 A | | 8/1978 | Kraus et al. |
| 4,413,202 A | | 11/1983 | Krempl et al. |
| 4,566,316 A | | 1/1986 | Takeuchi |
| 4,884,223 A | * | 11/1989 | Ingle et al. .................. 364/550 |
| 4,987,528 A | * | 1/1991 | O'Brien ....................... 364/184 |
| 4,987,898 A | * | 1/1991 | Sones ........................... 128/645 |
| 5,099,615 A | | 3/1992 | Ruble et al. |
| 5,121,929 A | | 6/1992 | Cobb |
| 5,154,084 A | | 10/1992 | Sonderegger et al. |
| 5,181,180 A | * | 1/1993 | Munro ......................... 364/492 |
| 5,357,162 A | | 10/1994 | Aiyoshizawa et al. |
| 5,433,015 A | * | 7/1995 | Mazenet ....................... 33/815 |
| 5,437,525 A | | 8/1995 | Bras |
| 5,505,093 A | | 4/1996 | Giedd et al. |
| 5,527,046 A | | 6/1996 | Bedford |
| 5,537,811 A | | 7/1996 | Pidoux et al. |
| 5,575,078 A | * | 11/1996 | Moulton, III ................ 33/815 |
| 5,615,067 A | | 3/1997 | Jabbari et al. |
| 5,713,121 A | | 2/1998 | Kim |
| 5,724,718 A | * | 3/1998 | Moir et al. ............... 29/603.03 |
| 5,732,458 A | | 3/1998 | Moir et al. |
| 5,761,002 A | | 6/1998 | Moir et al. |
| 5,774,974 A | | 7/1998 | Dunfield et al. |
| 5,777,832 A | | 7/1998 | Yi et al. |
| 5,983,485 A | * | 11/1999 | Misco ...................... 29/603.03 |
| 5,986,221 A | * | 11/1999 | Stanley ........................ 177/136 |
| 6,104,896 A | * | 8/2000 | Zaman et al. ................ 399/117 |

FOREIGN PATENT DOCUMENTS

| | | |
|---|---|---|
| WO | WO93/06599 | 4/1993 |

OTHER PUBLICATIONS

Force Imaging Technologies, "Uniforce," Form 2299–94 Sales Brochure for "Uniforce", Force Imaging Technologies (Chicago, IL), Dec. 8, 1994).
Force Imaging Technologies, "UniForce Technical Notes and Sensor Design Guide," Form 2504–98 Sales Brochure, Force Imaging Technologies (Chicago, IL), (Dec. 8, 1995).
IBM Technical Disclosure Bulletin, "Disk Pack Assembly Design" (Nov. 1989, p. 129).

\* cited by examiner

Primary Examiner—Carl J. Arbes
Assistant Examiner—Minh Trinh (57) ABSTRACT

An inventive method of manufacturing precisely-compressed multi-layer stacks is presented. Two stacks are assembled. One stack, having a compression sensor between two layers, is then compressed with an initial compression force, and the signal from the sensor is measured. The other stack is then compressed with a force derived from the measurement.

10 Claims, 13 Drawing Sheets

METHOD OF MANUFACTURING PRECISELY COMPRESSED STACKS

RELATED APPLICATION

This application claims the benefit of provisional application Ser. No. 60/100,193 filed on Sep. 14, 1998.

FIELD OF THE INVENTION

The present invention relates generally to relates to components manufactured with steps including compression and clamping. More particularly, the present invention relates to precise control of such compression and clamping.

BACKGROUND OF THE INVENTION

Systems such as disc drives and ring laser gyroscopes require stacked mechanical components having shapes defined with a very high precision. Some of these components are very thin, and can be warped or cracked by the application of high clamping forces. High clamping forces are frequently necessary, however, for stable retention of components.

Disc clamps for magnetic hard disc drive spindles have as their primary objective the clamping of the magnetic hard discs in a stack onto the spindle so that the discs do not shift radially under shock. To minimize mechanical distortion, which is made worse with large temperature shifts, it is desirable to use friction contact rather than to rely upon adhesives or screws to prevent radial shift. Such a shift, otherwise known as "disc slip", typically results in total failure of the disc drive due to misalignment of the pre-recorded tracks on the slipped disc from the pre-recorded tracks on the other discs.

One or more discs are held in position by adjacent layers. Spacer layers are positioned between discs. The required disc clamping force is conventionally determined by the shock specification of the disc drive. For example if the disc drive specification requires that the disc drive withstand a shock of 300 G's, a radial friction force F of about three pounds must be applied to resist disc slippage. With conventional materials, the clamp/disc interface has a coefficient of friction ($\mu s$) of 0.15. The axial (normal) force magnitude N necessary to provide this friction is thus $F/\mu s$ =3 lbs./0.15=20 lbs.

As disc drives become smaller, they are also becoming thinner. This puts severe constraints on the overall stack height of the disc/spindle assembly, which in turn, necessitates a reduction in the thickness of the discs and the height of the disc clamp above the spindle. As discs become smaller, there is also a tendency for the discs to warp into a saddle shape due to the required clamping force of the disc clap to prevent "disc slip". For these reasons, new disc clamping approaches are required.

One approach suggested in PCT Application No. WO93/06599 is to employ an annular clamp and spacer having a plurality of fingers exerting a radial pressure on a first disc and a plurality of projections bearing on a second disc to control radial movement of the first disc and the separation of the two discs.

Another approach is suggested in IBM Technical Disclosure Bulletin Vol. 32, No. 6, November 1989, page 129, Disc Pack Assembly Design, which describes the use of a grooved spliting to clamp a plurality of discs. Each disc rests in a groove in the ring which is squeezed and slipped into the internal diameter of the discs, when the ring is released it exerts a radial clamping force on the discs.

None of the existing approaches provides a manufacturing process for precise control of clamping force that ensures adequate clamping without unduly stressing delicate layers. All of them, moreover, require changes to at least one component of every stack, which can incur added costs and/or performance losses.

SUMMARY OF THE INVENTION

The present invention is an improved method of controlling the compression of multi-layer stacks without the need for modifying components in every stack. It includes steps of assembling a first stack with a force sensor between two of its layers, and compressing the stack with an initial force value. An improved force value is derived, at least in part, from a signal received from the force sensor. A second stack is assembled and compressed using the improved force value. Numerous "second stacks" can be made in this manner without substituted components.

The present invention optionally includes steps of clamping the first stack, waiting 0.1 to 10 seconds, releasing the platform-exerted force, and then extracting a measured force value from the received signal. It optionally includes steps for making additional stacks with or without sensors or otherwise to generate several signals to acquire useful measurements. For instance, optional steps are provided for determining the fate of one stack (i.e., preserving or discarding) by the performance of another. Additionally, specific embodiments are presented of components and systems that are improved from those of the prior art by use of the inventive method.

BRIEF DESCRIPTION OF THE DRAWINGS

FIG. 6 shows a flowchart of yet another aspect of the present invention.

FIG. 11 shows two plots of measured compression force as a function of time.

DETAILED DESCRIPTION

Figure 1:
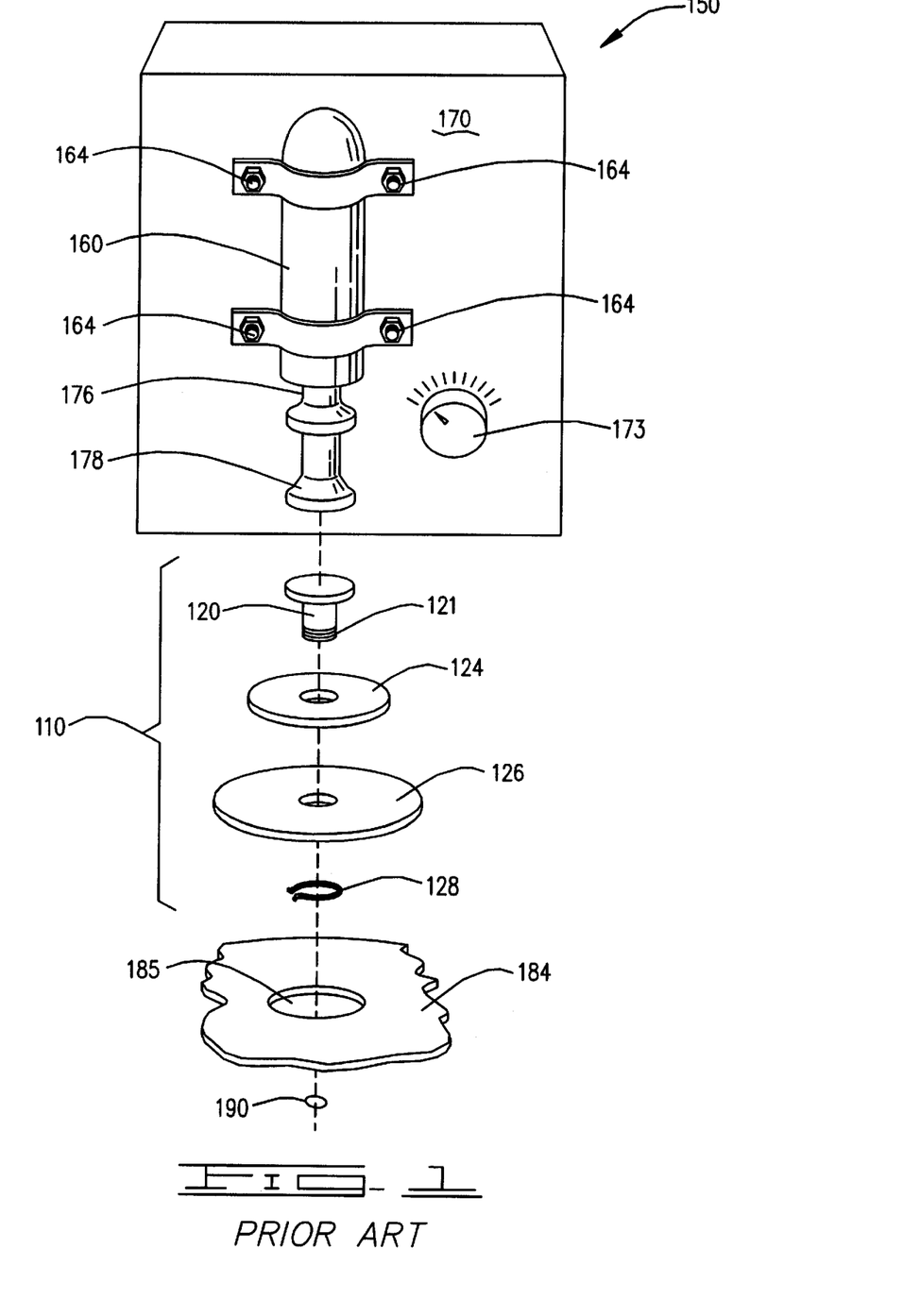
FIG. 1 depicts a prior art assembly platform aligned to compress a stack shown in vertically exploded form.

FIG. 1 depicts an assembly platform for making compressed stacks according to known methods. The stack 110 comprises a pin 120 along axis 190 positioned to pass through upper and lower layers 124 and 126 to engage clamp 128 in one or more grooves 121. The assembly platform comprises a work surface 184 having an opening 185 and a press 150. The press 150 comprises a cylinder 160 mounted by bolts 164 to a housing 170, a press control 173, and a piston 176 rigidly coupled to an arm 178.

Figure 2:
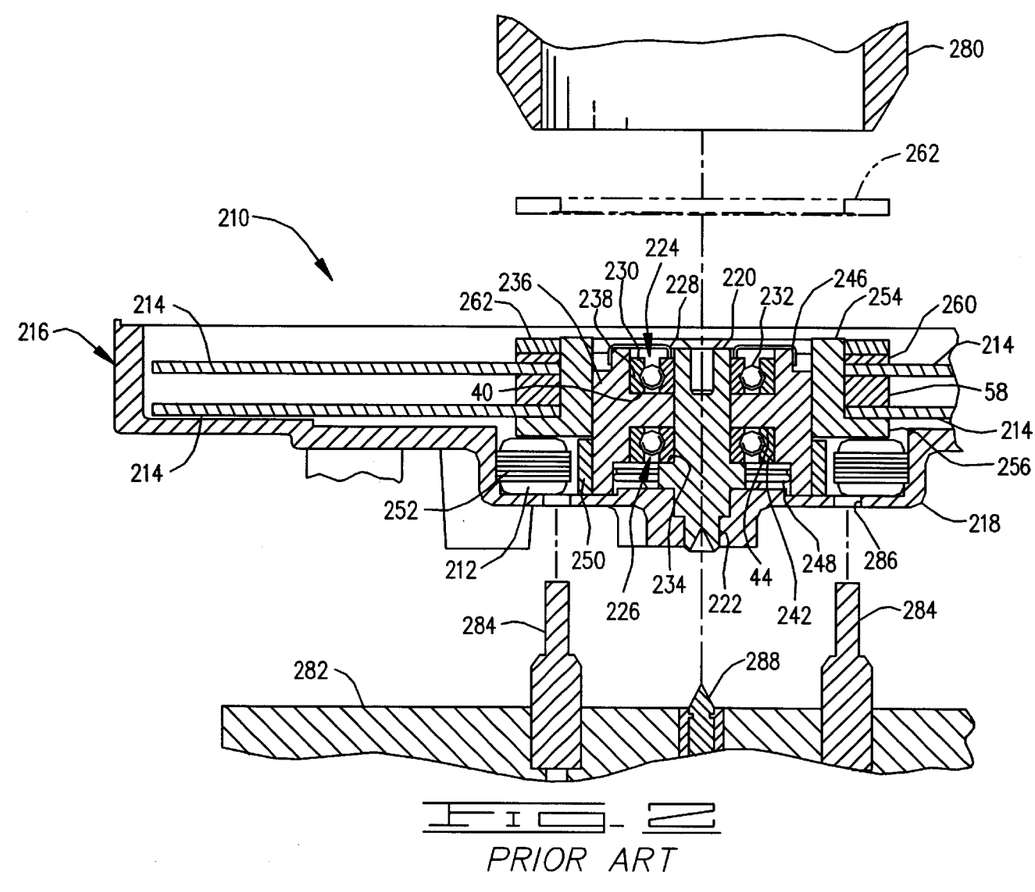
FIG. 2 depicts a state-of-the-art disc drive unit on an assembly platform similar to that of FIG. 1.

FIG. 2 depicts a state-of-the-art disc drive unit 210 on an assembly platform similar to that of FIG. 1. The unit 210 a spindle motor 212 for rotatably driving a stack of memory storage discs 214 arranged to fit within the vertical profile available to the disc drive unit 210. The disc drive unit 210 comprises a so-called "hard" disc drive of the general type used in modern personal computers and the like. The disc drive unit 210 conventionally includes a substantially sealed housing 216 defined by a rigid lower base 218 and a removable upper housing cover (not shown). The housing 216 has an overall size and shape with generally standardized external dimensions selected to fit within a limited installation envelope within a cabinet for a central processor unit of a computer.

The disc drive unit 210 includes a head positioner assembly (not shown) mounted within the housing 216 at a position alongside the disc stack. The head positioner assembly supports a plurality of individual arms having electromagnetic heads at the distal ends thereof in close proximity with respective upper and lower surfaces on the discs 214. A suitable actuator motor such as a movable coil DC motor, and a corresponding motor controller function to displace the heads through generally radial traverses relative to the discs 214 for purposes of reading and writing data.

A central shaft 220 is securely fixed to a portion of the housing lower base 216, and the memory storage discs 214 are mounted for rotational movement within the housing 216 about the shaft 220. The shaft 220 includes a lower threaded end 222 that, typically, passes through the housing lower base 218 and is secured in place.

The shaft 220 is formed by machining or the like to accommodate predetermined positional mounting of upper and lower bearing units 224 and 226. More specifically, the two bearing units 224 and 226 comprise a pair of precision ball bearing units each having an annular inner race 228 cooperating with an annular outer race 230 to contain an annular array of bearing balls 232 therebetween. The upper bearing unit 224 is positioned adjacent to an upper end of the shaft 220, and the lower bearing unit 226 is positioned in a downward spaced relation to the upper bearing unit 224 toward a position with its inner race 228 seated against an axially upwardly presented shoulder stop 234 on the shaft 220.

The outer races 230 of the two bearing units 224 and 226 rotatably support a generally cylindrical hub core 236 constituting the rotor of the spindle motor 212. The outer race 230 of the upper bearing unit 224 is secured directly within an upper bore 238 of the hub core 236 in seated relation against a shoulder stop 240. Similarly, the outer race 230 of the lower bearing unit 226 is secured directly within a lower bore 242 of the hub core 236 in seated relation against a shoulder stop 244.

The rotary interfaces between the shaft 220 and the hub core 236 are sealed to prevent migration of bearing contaminants or the like into contact with the memory storage discs 214. Although the specific structure of the requisite sealing means may vary, a labyrinth seal 246 is utilized adjacent to the upper bearing unit 224, and an exclusion ferro-fluid seal unit 248 is utilized adjacent to the lower bearing unit 226.

The hub core 236 supports, at its lower end, a plurality of permanent magnets 250 which interact with an electromagnetic stator core 252 to rotate the hub core 236 about the shaft 220. The hub core 236 also supports an outer disc supporting hub 254, which supports the stack of storage discs 214 for rotation within the disc drive housing 216. In this regard, the discs 214 are stacked upon a lower outer support flange 256 of the supporting hub 254. The discs 214 are separated from each other by an intervening spacer ring 258 of precision height, thereby orienting the discs 214 in a precision spacing for access therebetween of the various heads discussed previously. An upper spacer ring 260 overlies the uppermost disc 214, and a ring clamp 262 is fastened onto the upper end of the outer disc supporting hub 254 to compress the stack of discs 214 and related spacer rings 258 and 260. When so assembled, as the hub core 236 is driven during motor operation, the group of discs 214 are rotated as a collective unit.

An installation assembly is utilized to secure the ring clamp 262 about the supporting hub 252 over the upper spacer ring 260. The installation assembly is shown in the form of a disc clamp installation tool comprising an upper ram 280 and a lower nest assembly 282. The nest assembly 282 is provided with a plurality of housing positioning pins 284 which engage apertures 286 in the housing 216 of the disc drive unit 210, and a shaft positioning pin 288 that engages the lower threaded end 222 of the central shaft 220.

Figure 3A:
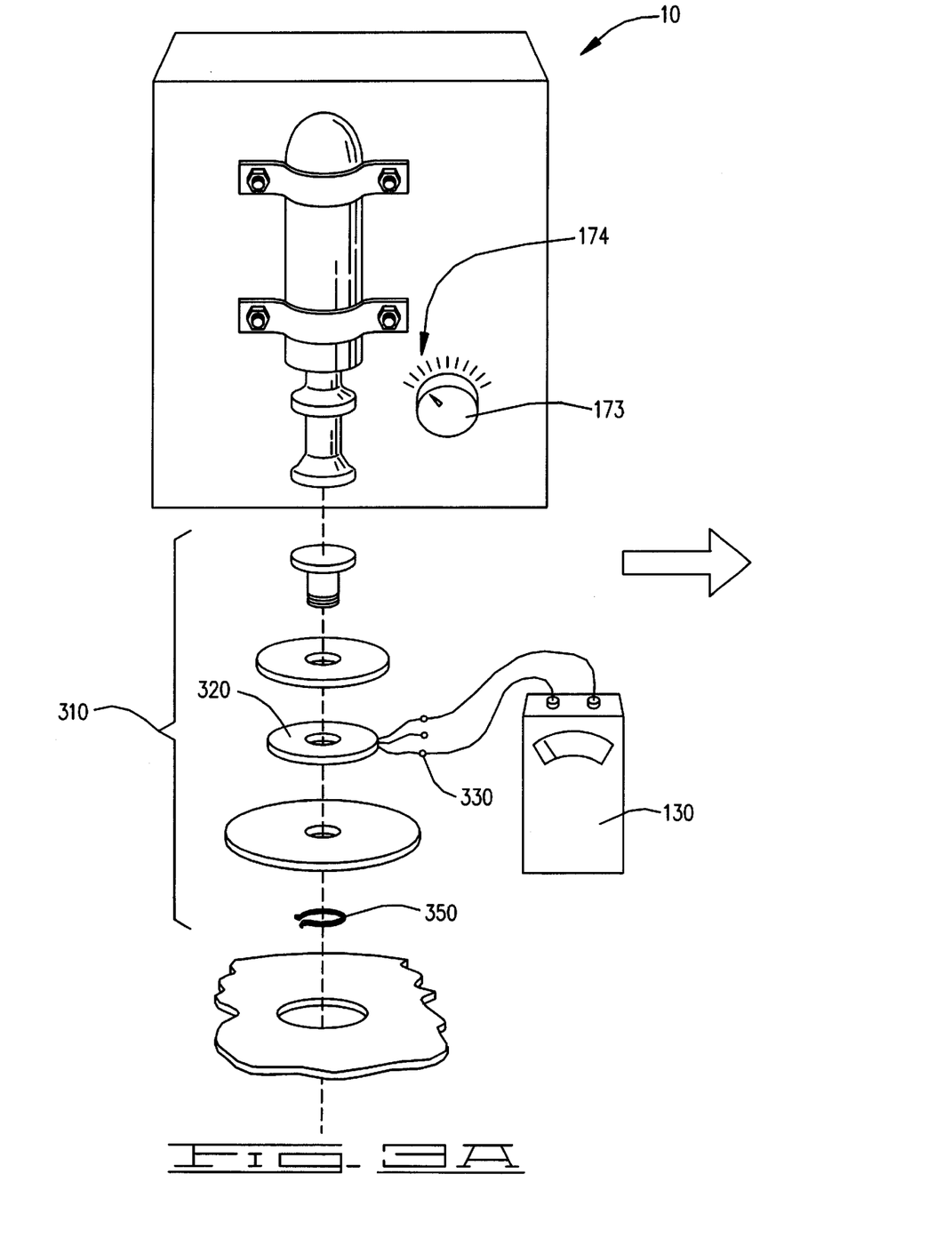
FIG. 3 illustrates a platform like that of FIG. 1 modified by the addition of a test instrument, at successive stages of the present inventive method of manufacture.
Figure 3B:
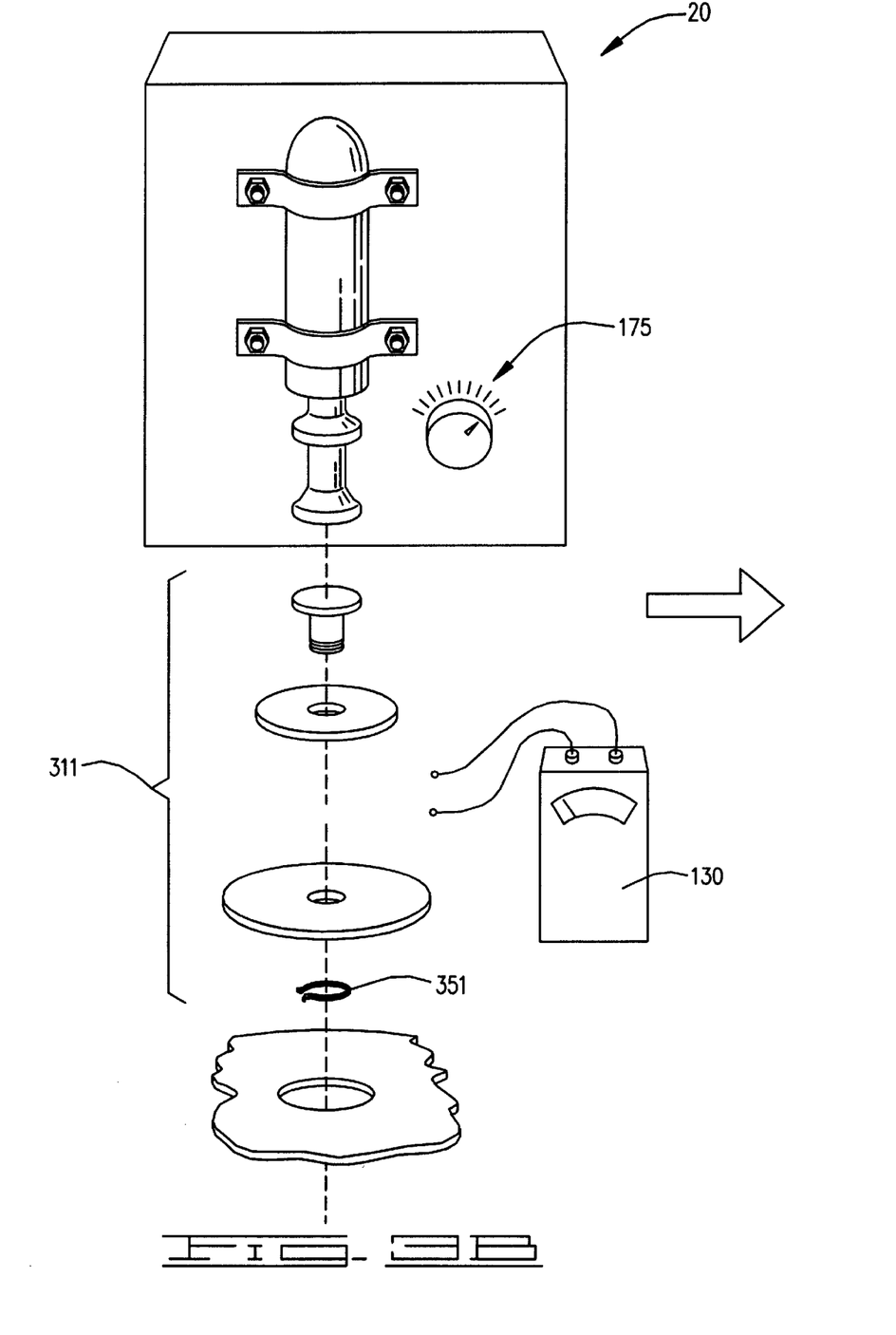
Figure 3C:
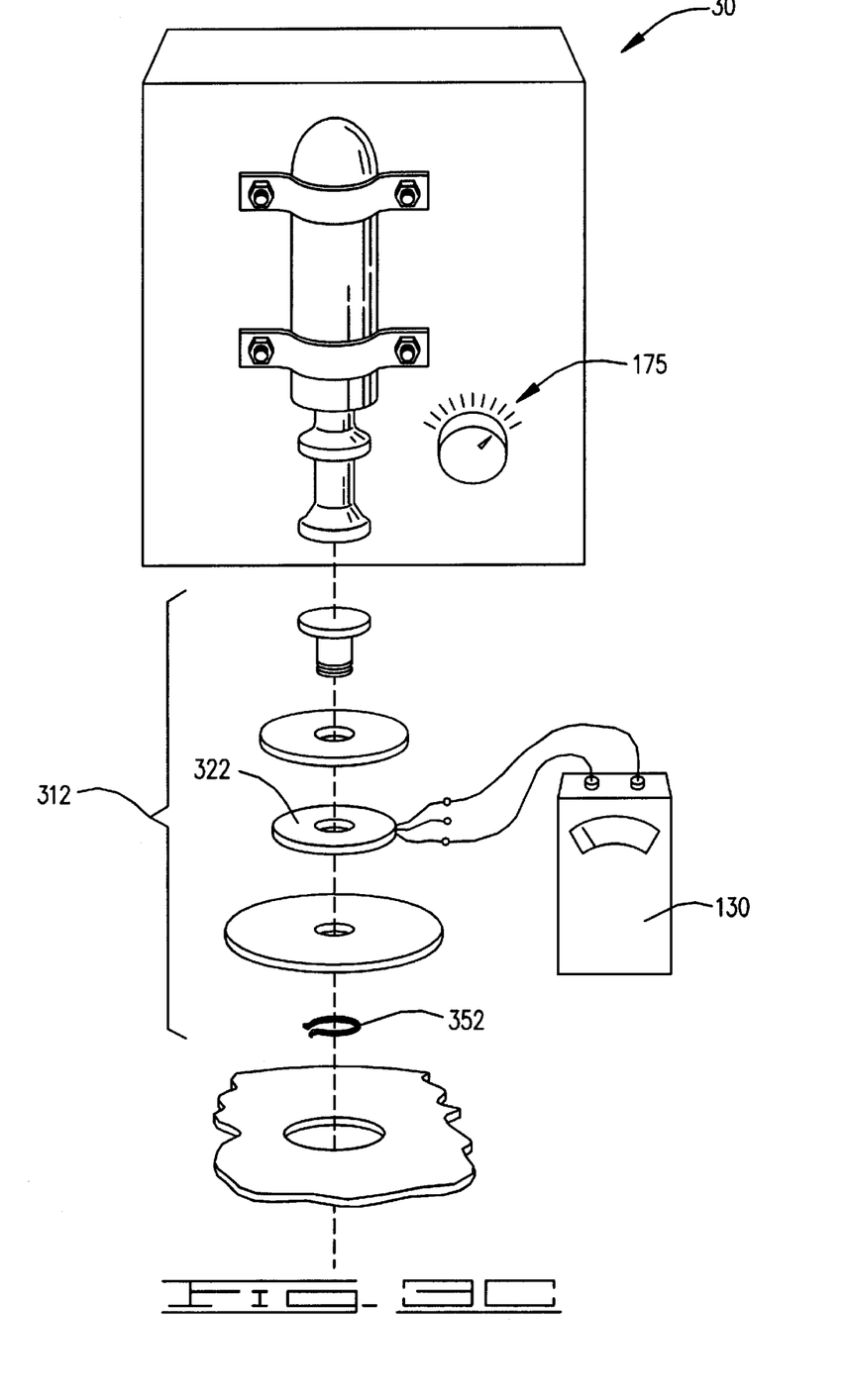

FIG. 3 illustrates a platform like that of FIG. 1 modified by the addition of a test instrument 130, at three successive stages 10,20,30. The test instrument 130 is depicted as a stand-alone, hand-held analog ohmmeter, but may comprise any of a great variety of test instruments known in the art. Preferably, the test instrument is coupled to a computer network and to the press 150. FIG. 3 also illustrates stacks 310,311,312 produced by this method. Force sensor 320 is assembled into the first stack 310, and has at least two electrical contacts 330 coupled to the test instrument 130. A preferred force sensor 320 is a thin film resistance pressure sensor having a thickness of about 0.003 inches or less.

In the first stage 10 of FIG. 3, first stack 310 is assembled with force sensor 320 and compressed with force control 173 at a predetermined first position 174. Test instrument 130 receives a signal indicative of the compressive force experienced by sensor 320. Force control 173 is then adjusted to a second position 175 derived from the value of the received signal. In a preferred embodiment, a value of the received signal is converted to units of force (e.g., N. or lbs.), recorded in a computer memory, and used to update the press control 173 electronically. Alternatively, a computer may be used to record a first force-indicative value, to calculate a difference between that value and a desired value, and to adjust the mechanism of the force control 173 accordingly.

In the second stage 20 of FIG. 3, second stack 311 is assembled without a force sensor. Force control 173 compresses the stack with the derived force. In a typical manufacturing environment, it would be desirable to make several additional second stacks 311 in an identical manner, consecutively.

In the third, optional stage 30 of FIG. 3, a third stack 312 is assembled with a second force sensor 322. According to one aspect of the present inventive method, test instrument 130 records a measurement from the signal it receives from force sensor 322. The measurement is a quality indicator of the third stack 312 and also of one or more second stacks 311 assembled during stage two 20.

Figure 4:
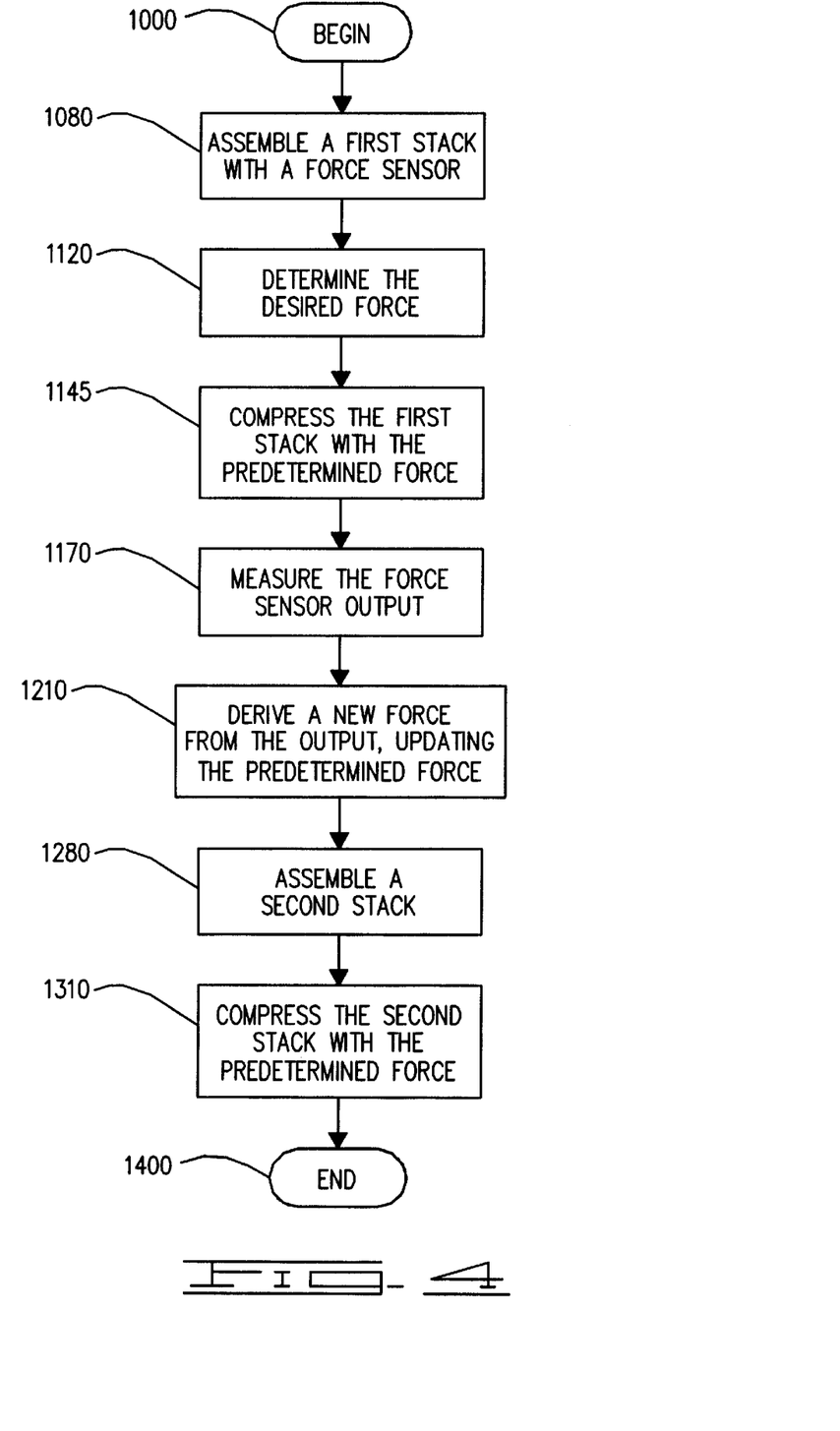
FIG. 4 shows a basic flowchart of an aspect of the present inventive method of manufacture.

FIG. 4 shows a flowchart of an aspect the inventive method. A first stack is assembled 1080, comprising at least two layers sandwiching at least one force sensor. A desired force is determined 1120 such as by setting a hydraulic or pneumatic press control to a predetermined value (see FIG. 1). Many equivalent mechanisms are known in the art, such as selecting or positioning a desired set of weights to be dropped or laid in a position to compress the first stack. The stack is then compressed 1145 with the predetermined force.

Following compression, the clamp may optionally be applied to the stack and allowed to engage the shaft. This may require a lapse of time, typically less than 10 seconds, during/after which the sensor output is measured 1170. From measured value(s), a new force is then derived 1210, updating the value(s) previously determined at step 1120. The term "update" is used here in its conventional sense, encompassing either a modification or a validation of an unchanged value. Multiple force values are of special interest in an application where force distribution is important such as hard disc assembly (HDA) stacks. Force system alignment adjustments are known in the art and vary considerably between applications.

After modifying the predetermined force, one or more second stacks are assembled 1280 and compressed 1310. For applications where one iteration of deriving a new force provides adequate assurance that compression force specifications have been satisfied, force sensing is not required for the second stack. A preferred embodiment of the present methods thus excludes force sensors from the second stack.

Figure 5:
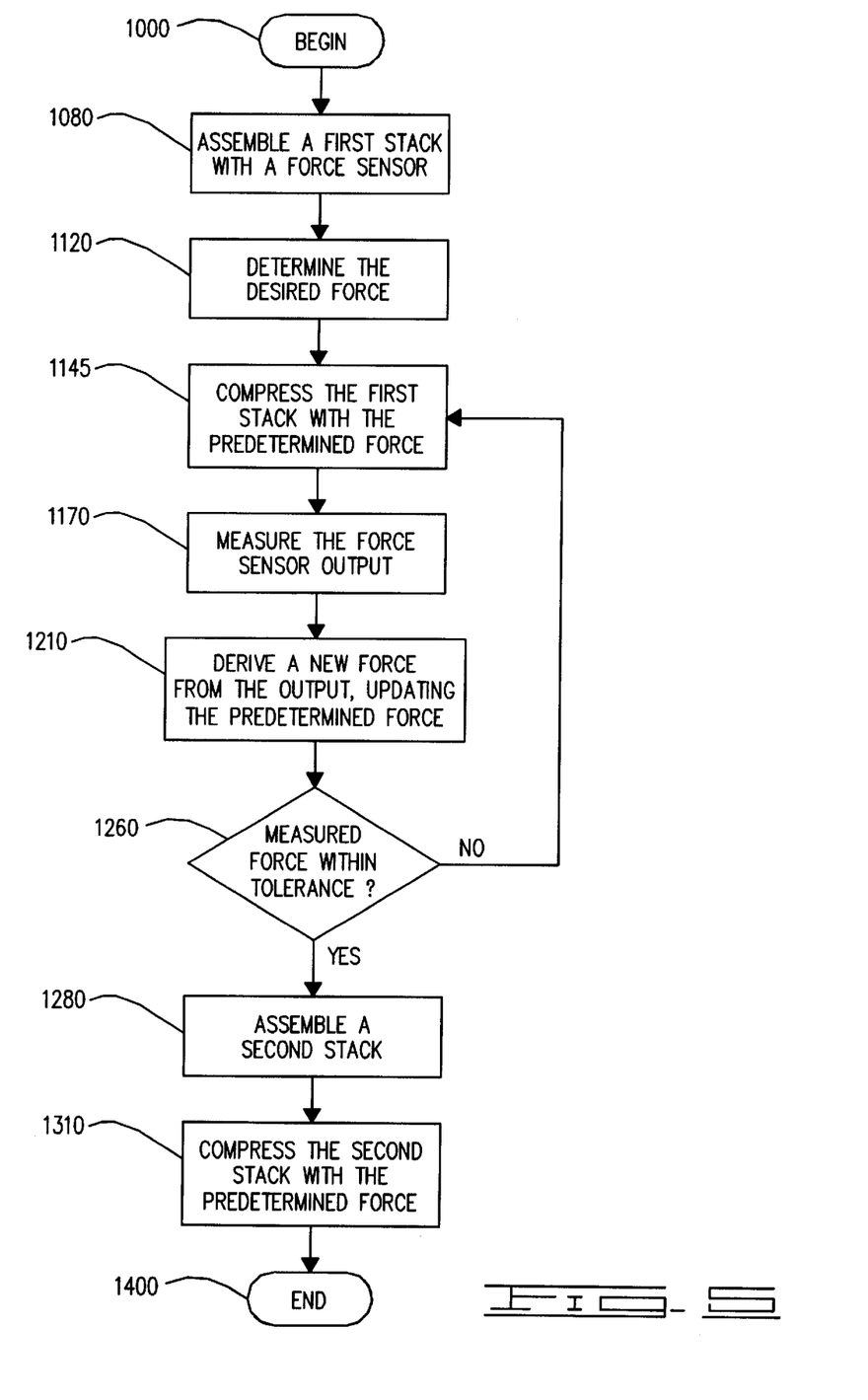
FIG. 5 shows a flowchart of another aspect of the present invention.

FIG. 5 shows a flowchart of another aspect of the present invention. After the force sensor output is measured 1170, the measured force is tested to ascertain whether it is within tolerance 1260. Defining an appropriate tolerance range may necessitate some characterization in some cases, depending on the context. In HDA's, compression tolerance ranges are conventionally defined by the design specification. Excessive or non-uniform compression can result in deformation, which stresses the discs and causes vibration during rotation. Insufficient compression can result in layer slippage. Either can cause intermittent behavior resulting in field failures. Overly narrow ranges, on the other hand, may cause undue yield losses.

FIG. 6 shows a flowchart of another aspect of this invention. About the same time (either before or after) the one or more second stacks are assembled 1280 and compressed 1310, one or more third stacks are assembled 1320 and compressed 1340 with a force sensor. The third stack's force sensor output is measured 1350 and tested 1360. The measurements may be recorded briefly, such as in a tester memory, or accumulated in a database. The results are used to discriminate "accepted" assemblies from "rejected" assemblies. The latter are then destroyed (disassembled) or re-worked 1370. If the measured force is within tolerance, the second stack is preserved 1380 for installation into a system.

Figure 7:
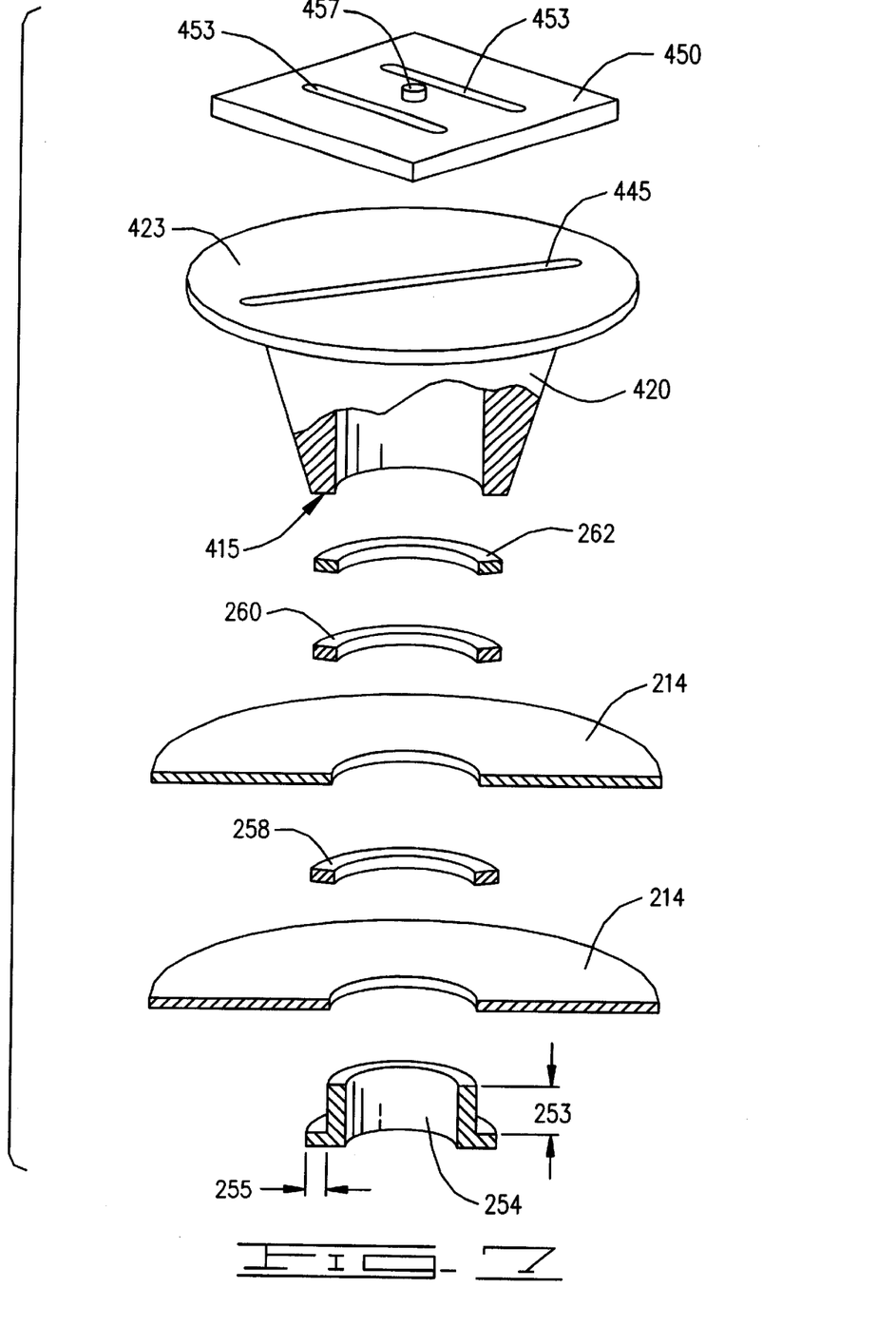
FIG. 7 illustrates a perspective view of a coupling suitable for use in assembling stacks such as that of FIG. 2.

FIG. 7 illustrates a coupling suitable for use in assembling stacks such as that of FIG. 2. Hub 254 is shown in exploded, cutaway form. Hub 254 comprising cap layer portion 255 toward which discs 214, spacers 258,260 and ring clamp 262 are to be pressed (see FIG. 2). Hub 254 also comprises hollow shaft portion 253 which fits through the discs 214 and spacers 258,260, protruding upward beyond ring clamp 262. To force ring clamp 262 below the upper surface of the shaft portion 253, therefore, interface 420 comprises annular ram surface 415 with an inner diameter at least as large as the outer diameter of the shaft portion 253. Interface 420 also comprises a friction surface 423 having a bolt slot 445 which can be fitted with two bolts extending upward, allowing them to slide. Square plate 450 sits atop the friction surface 423, allowing the two bolts to extend through bolt slots 453 and to engage nuts (not shown) to adjust square plate 450 into a desired position and affix it there rigidly. This allows for a range of positions of the load boss 457 relative to the interface.

Figure 8:
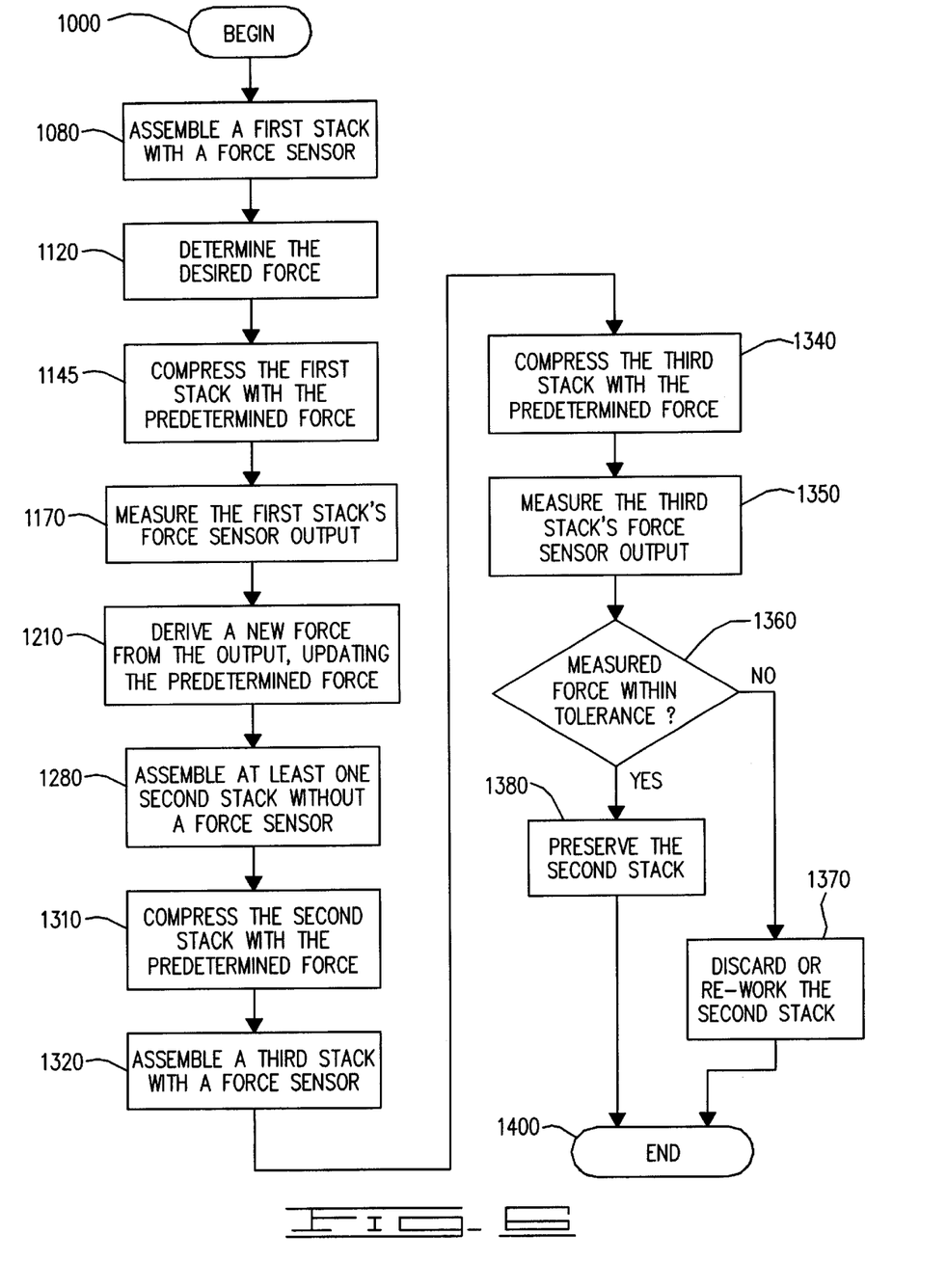
FIG. 8 illustrates a top view of the coupling of FIG. 7.

FIG. 8 illustrates a top view of the coupling of FIG. 7, showing how slot 445 intersects with slots 453 in two places for bolted coupling. Boss 457 can thus engage a weight aligner, a hydraulic piston, or other suitable force transfer mechanism. Numerous adjustable force transfer couplings like that of FIG. 7 are known in the art.

Figures 9, 10:
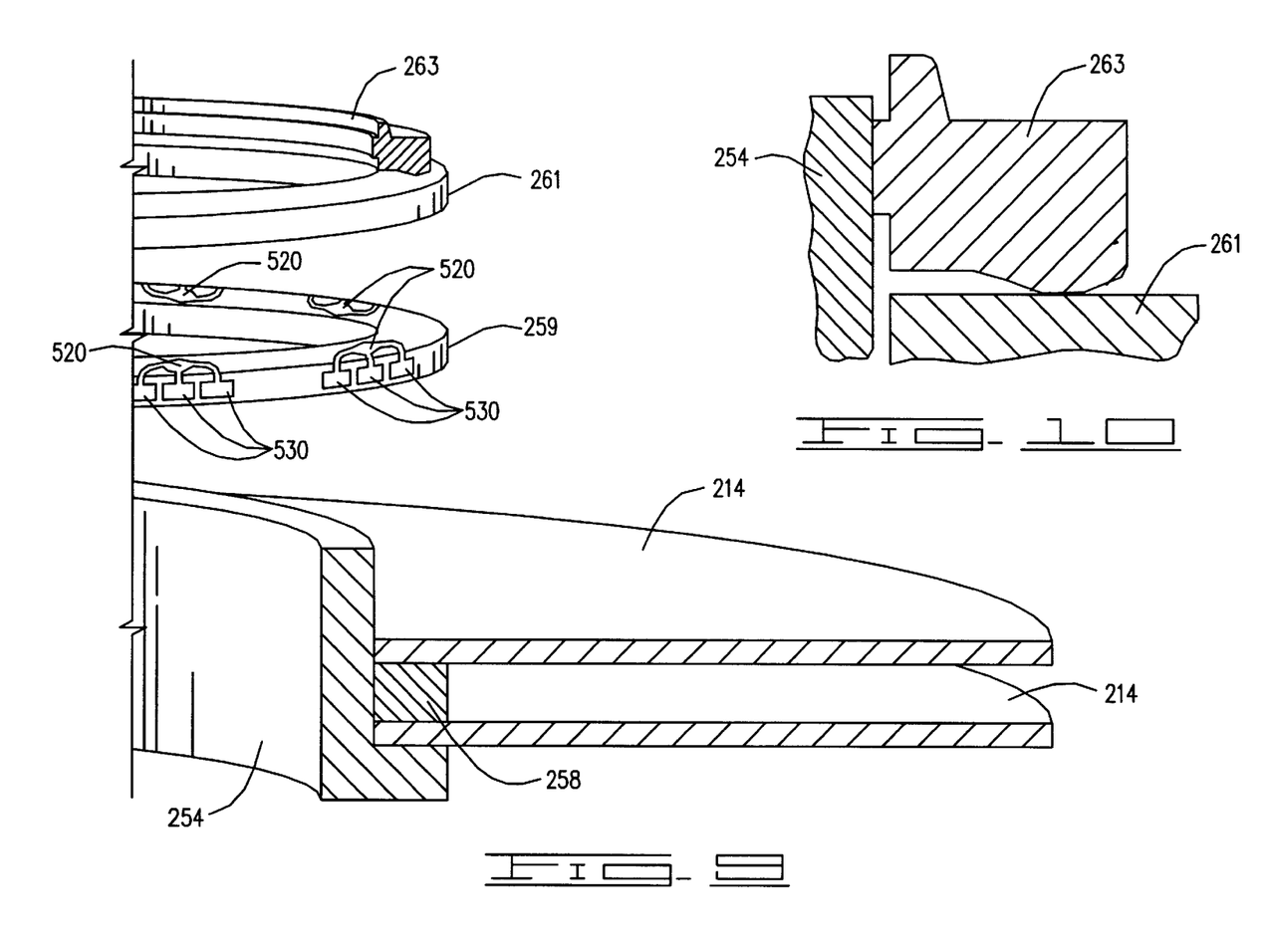
FIG. 9 illustrates an enlarged view of a partially assembled stack, slightly modified from that of FIG. 2.
FIG. 10 illustrates an enlarged view of the ring clamp of FIG. 9 in cross section.

FIG. 9 illustrates an enlarged view of a partially assembled stack, slightly modified from that of FIG. 2. Upper spacer 260 has been replaced by two spacers 259 and 261. Several force sensors 520 are distributed about the top of spacer 259, each having electrical contacts 530 on the side of spacer 259. Sensors 259 are optionally glued or deposited onto spacer 259, or otherwise affixed in the positions shown. In these positions, the contacts are accessible for a test instrument as the disc rotates. In a preferred embodiment, a stationary test instrument (not shown) measures a force from each force sensor 520 as it passes.

A preferred shrink-fit ring clamp 263 is depicted (cut away to display its cross section) atop spacer 261. FIG. 10 shows an enlarged view of the ring clamp 263. Ring clamp 263 is heated so that it expands, pushed onto the hub 254 so that it engages spacer 261 with a controlled force, and cooled so that it grips the hub firmly. Note that ring clamp 263 extends above hub 254 so that the ram surface 415 (see FIG. 7) need not be annular. It may be hemispherical, for example.

Several variations on the sensor arrangement of FIG. 9 are of particular interest. A sensor 520 may be used with two or more annular contacts around the outside of spacer 259 or atop a cap of the hub 254 (not shown). These provide for continuous contact between the test instrument and the sensor 520. If only one non-annular sensor is used, off-center, spacers having a thickness within about 10% of that of the sensor 520 should be used. Such arrangements are easily implemented by those skilled in the art.

FIG. 11 shows two plots of measured compression force as a function of time. A first experiment plots force signal 611 as a thick line. Prior to T =2.8 seconds (along horizontal axis 630), the stack is assembled, and ring clamp 263 is expanded by heating and pressed onto a clamp hub 254 (see FIG. 10). At T=2.8 seconds, a compression force is applied to the stack (i.e., by dropping a ram onto the clamp or a positioning interface to the clamp). In the present case, the dropping results in an overshoot 612 in the measured force, which quickly subsides 613. The ram is then locked into its position 614 (i.e., prevented from retreating) by a fine-tooth ratchet or a similar known mechanism. Compression force is allowed to increase 615 for at least 1 to 5 seconds (by the action of the ring clamp 263) reaching a maximum at a sensor output signal of 3.6 volts (along left axis 610). From force sensor characterization, this is translated to a corresponding force output of 180 lbs. (along right axis 620). At T=11.8 seconds, the ram is unlocked. For the first experiment, a hub 254 lacking a cap layer 255 (see FIG. 7) was used, so the compression force quickly drops to zero.

A second experiment plots force signal 617 as a thin line reaching a maximum compression 624 measured at about 120 lbs. This stack has a hub 254 with a cap layer 255. When the ram is released 618 at T=9.3 seconds, therefore, the compression force drops to about 85 lbs. In a simple stack of parallel layers radially symmetric about the hub 254, this force is felt equally by all components between the hub 254 and the clamp 263 after the ram is released and the stack is removed from the assembly platform.

FIG. 11 shows two force-indicative signals that vary as time passes. It is within the ordinary engineer's skill to derive or estimate values of the measured overshoot force 622, settling force 623, maximum force 624, or equilibrium clamped compression (ECC) force 625 given force signal 617 and the other teachings in this document. Any of these may optionally provide a measured value which is then compared with a maximum and/or minimum value to ascertain whether the stack is within tolerance. According to the method of FIG. 6, this information can then be used as a quality indicator of other stacks. As one non-limiting example, force-indicative values 622,623,624,625 are measured (i.e., extracted) from each of ten force-indicative signals 617. For convenience, the signals and values are not converted to force units, but are left in units of volts. For each of the four sets of ten data points, a mean and standard deviation (S.D.) are then calculated as follows:

|  | Mean (volts) | S.D. (volts) | Minimum (volts) | Maximum (volts) |
| --- | --- | --- | --- | --- |
| Overshoot Force | 2.423 | 0.068 | (n/a) | 2.627 |
| Settling Force | 1.810 | 0.021 | (n/a) | (n/a) |
| Maximum Force | 3.053 | 0.011 | 3.020 | (n/a) |
| ECC Force | 2.545 | 0.034 | 2.443 | 2.647 |

Each of the force-indicative signals is desirably obtained from a different assembly platform. Each maximum and minimum shown is calculated as the mean plus or minus 3 × S.D. A judicious selection of four of the eight available limits derived by this method are then used as a multi-valued tolerance range for screening measured forces in step 1360 of FIG. 6. An engineer of ordinary skill can adapt the above-described criteria development technique to equivalent contexts such as welded clamps, different sensor input curves, and multiple simultaneous inputs. If test limits are derived from characterization data such as the above from only one platform, a larger multiplier than 3 (i.e., about 6–10) should be used. A rounding of test limits is also appropriate.

Figure 12:
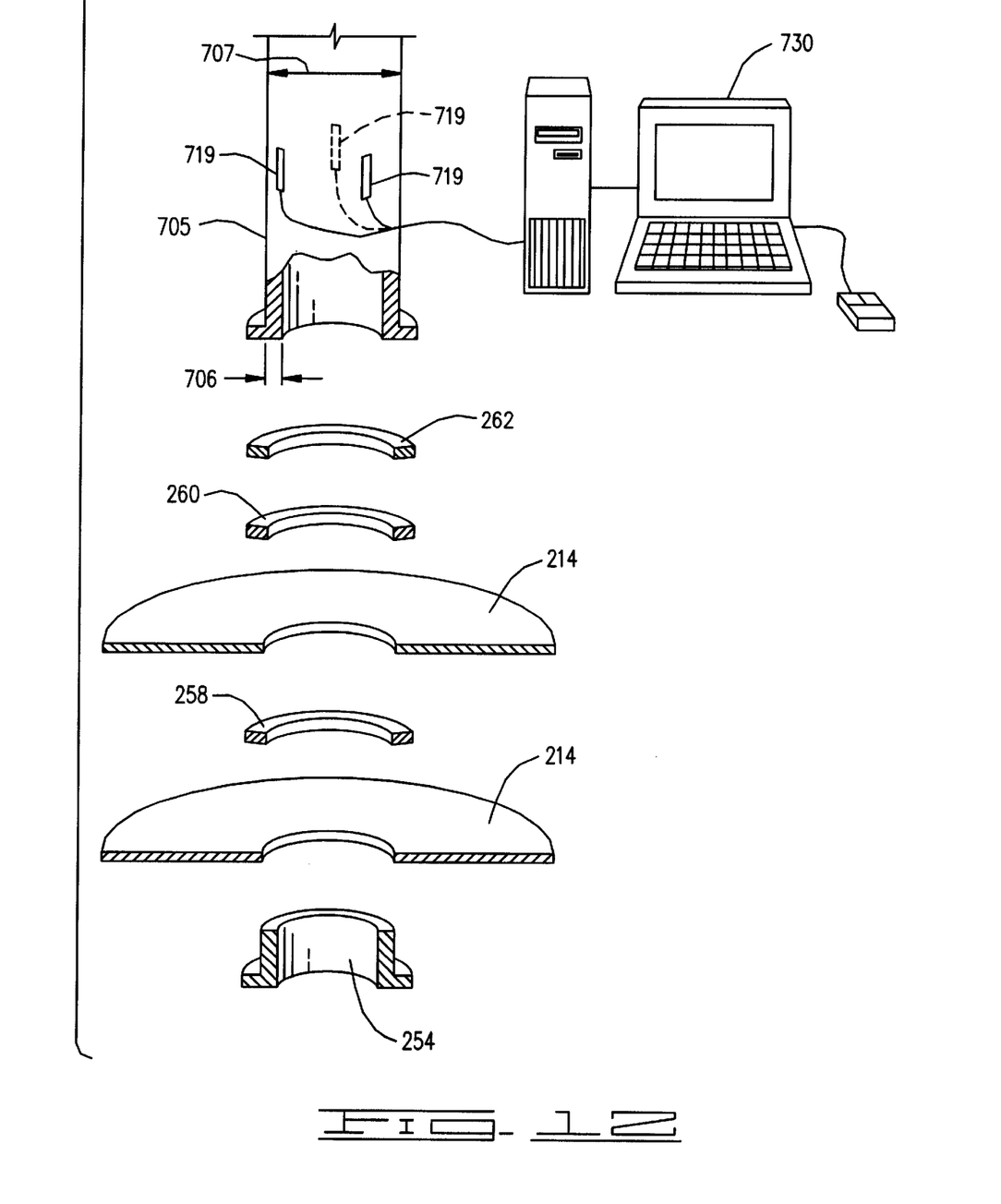
FIG. 12 illustrates a few external force sensors distributed about the circumference of an elongated ram.

FIG. 12 illustrates a few external force sensors 719 (strain gauges) distributed about the circumference of an elongated ram 705, about 5–50 cm tall. "External" is used here to mean "not within the stack," and thus can comprise one or more pressure sensors on an interface surface 415,423 (see FIG. 7). In the configuration of FIG. 12, the ram 705 can be made of an alloy having rigidity approximately equal to that of stainless steel or aluminum, in which case its thickness 706 is desirably about 0.2 to 2.0 millimeters and its diameter 707 is desirably about 100 to 1000 times larger. Alternatively, it can be made of a polymer or similarly flexible, resilient material shaped to stretch strain gauges 719 measurably as a generally longitudinal load is applied. Selecting an appropriate shape for such measurable stretching for a given ram material is within an ordinary engineer's skill. External sensors 719 (e.g. strain gauges) are attached and conventionally biased, and applied force is measured by an attached test instrument 730 (depicted as a computer connected to the sensors 719 by an interface card).

Figure 13:
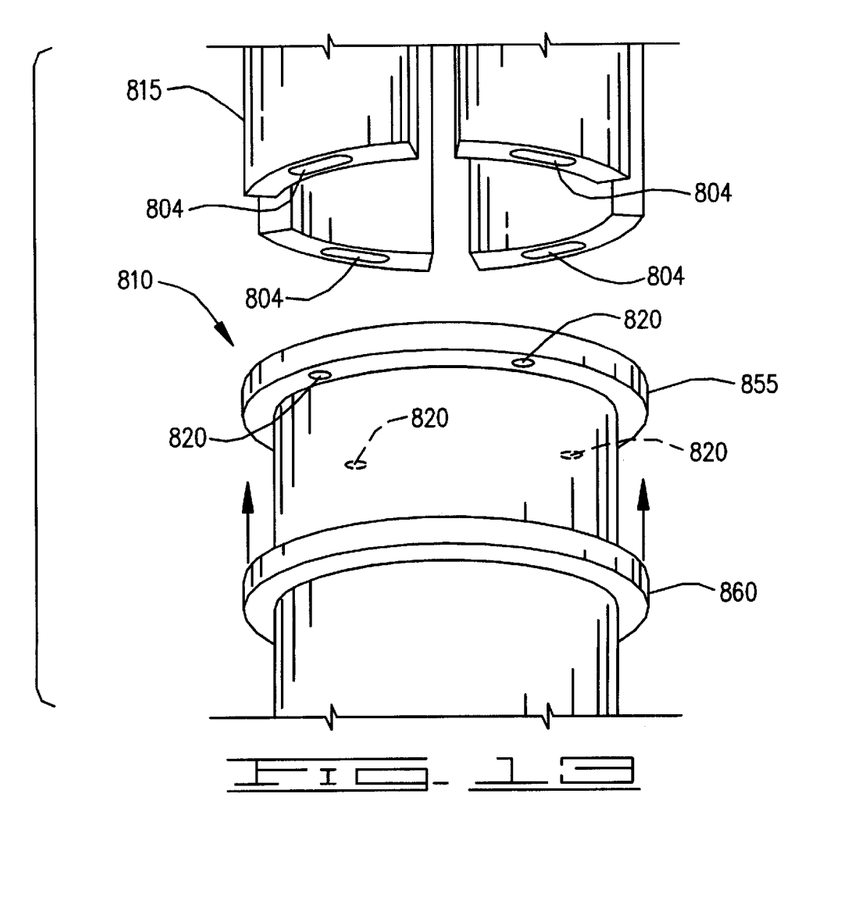
FIG. 13 illustrates a presently-preferred sensor configuration for the present invention.

FIG. 13 illustrates a presently-preferred sensor configuration for the present invention. Four circumferentially elongated external sensors 804 are uniformly distributed about the circumference of a four-part ram surface 815. Four internal sensors 820 are distributed about the underside of cap layer 855, each approximately aligned with a corresponding (nearest) external sensor. Known force loads (e.g. weights) are used to derive precise weight-to-voltage transfer functions corresponding to each external and internal sensor 804,820. For present purposes, each sensor's position will be identified by its angular position: 0, 90, 180, or 270 degrees.

The ram is installed onto an assembly station with a hydraulic press having a controllable force and two-degree-of-freedom angular adjustment. Layer 860 is brought into contact with internal force sensors, and ram surface 815 compresses stack 810. Referring to FIG. 3, a compression force controller setting 174 is determined by adjusting the initial force controller setting 174 and angular adjustment to provide desired external sensor 804 signal values (e.g., the voltage corresponding to the total initial force divided by the number of sensors). In the present case, the target equilibrium clamped compression (ECC) force is 100 lbs., and the initial force is set at 125 lbs. Initial compression forces are typically at least 10–30% higher than a specified ECC force, but shrink-fit clamps are initially compressed with about 10–20% less force than the resulting ECC force.

According to the method of FIG. 4, after the initial force is determined 1120, the first stack is compressed 1145 and a clamping means is applied to the stack 810. After enough time has passed so that the clamping means engages sufficiently to maintain a positive grip without the press force, the press force is released, and ECC values are measured 1170 by the signals from the internal sensors 820.

| Position (degrees) | External Initial Signal (volts) | Derived Initial Force (lbs.) | Internal ECC Signal (volts) | Derived ECC Force (lbs.) |
| --- | --- | --- | --- | --- |
| 0 | 1.43 | 32.5 | 1.45 | 30.1 |
| 90 | 1.39 | 30.5 | 1.36 | 27.4 |
| 180 | 1.36 | 29.1 | 1.13 | 19.3 |
| 270 | 1.39 | 30.5 | 1.24 | 23.0 |

From this table, it can be seen that the internal sensor 820 at 180 degrees has an undesirably small compression, for a target ECC force of 100 lbs. Therefore, a more uniform compression can be obtained for subsequently-compressed stacks by repositioning the ram to provide a voltage corresponding to a derived compression force at the corresponding external sensor that is 25/19.3=1.3 times higher than the derived initial force. Because the opposite sensor (at 0 degrees) indicated an undesirably large compression, these errors can be reduced by tilting the ram relative to the stack 810, which is easily accomplished with or without external sensors 804. Note, however, that the external sensor at 180 degrees measures a value indicating that it is providing 29.1/(32.5+30.5+29.1+30.5)=23.7% of the total compression force being exerted upon stack 810. This supports an inference that an appropriate revised voltage would correspond to a force of 25/23.7=1.05 times higher than the derived initial force. A preferred revised force according to the present inventive method is thus derived as a combination of a value from the internal signal and a value from the external signal, and in the present example is from 1.05 to 1.30 times larger than the initial (predetermined) force.

Tilting, as described above, can be accomplished by introducing a sloped shim between square plate 450 and friction surface 423 (see FIG. 7) or by any of many adjustment mechanisms known in the art. Further coupling improvements can be obtained by substituting a force application system for each of the several segments of the ram 815 that is independent of the system for the other segments, permitting four-point correction of saddle-type deformations.

Other methods according to the present invention can be used to improve the target ECC force range that is deemed acceptable, explained with reference to FIG. 4 as applied to a disc drive. To ascertain an appropriate maximum, 20 disc stacks are assembled 1080 with force sensors. The first is compressed with a force 3% higher than a nominal compression force. Each stack thereafter is compressed with a predetermined force 3% higher than that of the last, so that the 20th stack has a compression of 1.8 times nominal. The 20 drives then undergo thermal and vertical shock stress testing at rest and at speed (about 10,000 RPM), and the failing drives are identified. A palpable maximum ECC force corresponds to the highest measured ECC force in a passing drive. Similarly, a palpable minimum can be ascertained by assembling 20 disc stacks with progressively lower compression force and testing for drive failures induced by horizontal shock forces. An improved nominal compression force can then be derived as the midpoint between the empirical maximum and minimum.

All of the steps and structures described above will be understood to one of ordinary skill in the art, and will enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the preferred embodiments described herein are directed to stacks and methods for manufacturing them, it will be appreciated by those skilled in the art that the teachings of the present invention can be applied to variations such as measuring stack performance statistics to be recorded in connection with stacks assembled on that platform. The ability to record in situ compression allows for quality characterization or correlation under conditions of thermal, mechanical, or electrical stress to provide other manufacturing process refinements without departing from the scope and spirit of the present invention.

What is claimed is:

1. A method of making multi-layer stacks comprising steps of:
    (a) positioning at least one sensor between a first layer and a second layer;
    (b) assembling a first stack by inserting a first axial member through the first layer and the second layer;
    (c) assembling a second stack by inserting a second axial member through a third layer and a fourth layer;
    (d) compressing the first and second layers toward one another with a predetermined force;
    (e) receiving a sensor signal from the at least one sensor;
    (f) deriving a force value from the received sensor signal;
    (g) compressing the third and fourth layers toward one another with the force value derived from the sensor signal received in step (f);
    (h) clamping the second axial member while urging the third and fourth layers toward one another; and
    (i) repeating steps (a), (b), (d) and (e) to generate a plurality of received signals and deriving at least one test criterion from the received signals by steps comprising:
        (i1) extracting a measured equilibrium clamped compression force value from each of the several received signals;
        (i2) calculating a mean and a standard deviation of the extracted values; and
        (i3) using the mean minus 7 × S.D. as a minimum acceptable ECC value, thereby defining the at least one test criterion.

2. The method of claim 1, further comprising, after step (c) but before step (g), a step (i) of clamping the axial member while urging the first and second layers toward one another, the clamping step (i) comprising a sub-step (i1) of waiting about 5 to 10 seconds.

3. The method of claim 1, further comprising a step (m) of assembling the second stack into a disc drive.

4. The method of claim 1 in which at least part of compressing step (d) and at least part of receiving step (e) occur simultaneously.

5. The method of claim 1 in which positioning step (a) comprises a sub-step of (a1) affixing the at least one sensor to one of the layers.

6. The method of claim 5 in which the one of the layers comprises a surface defining a hole, the method comprising a step of distributing a plurality of sensors around the hole.

7. The method of claim 1, further comprising steps of:
    (j) positioning at least one supplemental sensor between a fifth layer and a sixth layer;
    (k) assembling a third stack by inserting a third axial member through the fifth layer and the sixth layer;
    (l) compressing the fifth and sixth layers toward one another with the derived force;
    (m) recording a measurement derived from a signal from the at least one supplemental sensor of the third stack as a quality-indicative statistic of the second stack; and
    (n) preserving the second stack only if the statistic meets the at least one test criterion.

8. The method of claim 1, further comprising steps of:
    (i) positioning at least one sensor between a fifth layer and a sixth layer;
    (j) assembling a third stack by inserting a third axial member through the fifth layer and the sixth layer;
    (k) compressing the fifth and sixth layers toward one another with the derived force;
    (l) recording a measurement derived from a signal from the at least one sensor of the third stack as a quality-indicative statistic of the second stack; and
    (m) preserving the second stack only if the statistic meets at least one predetermined criterion.

9. The method of claim 8, further comprising a step (n) of assembling the second stack into a disc drive.

10. The method of claim 1, in which the first and third layers are information storage discs.

* * * * *